(12) United States Patent
Kumar et al.

(10) Patent No.: US 11,465,763 B2
(45) Date of Patent: Oct. 11, 2022

(54) HYBRID-ELECTRIC AIRCRAFT, AND METHODS, APPARATUS AND SYSTEMS FOR FACILITATING SAME

(71) Applicant: Zunum Aero, Inc., Bothell, WA (US)

(72) Inventors: Ashish Andrew Kumar, Bellevue, WA (US); Burton Matthew Knapp, Redmond, WA (US)

(73) Assignee: Zunum Aero, Inc., Redmond, WA (US)

( * ) Notice: Subject to any disclaimer, the term of this patent is extended or adjusted under 35 U.S.C. 154(b) by 0 days.

(21) Appl. No.: 16/576,455

(22) Filed: Sep. 19, 2019

(65) Prior Publication Data
US 2020/0290742 A1    Sep. 17, 2020

Related U.S. Application Data

(63) Continuation of application No. PCT/US2018/023189, filed on Mar. 19, 2018.
(Continued)

(51) Int. Cl.
*B64D 27/24*    (2006.01)
*B64D 27/10*    (2006.01)
(Continued)

(52) U.S. Cl.
CPC ............ *B64D 27/24* (2013.01); *B64D 27/10* (2013.01); *B64C 29/0033* (2013.01); *B64D 2027/026* (2013.01)

(58) Field of Classification Search
CPC .......................... B64D 27/24; B64D 2027/026
See application file for complete search history.

(56) References Cited

U.S. PATENT DOCUMENTS 2,462,201 A * 2/1949 Kilgore .................. B64D 27/24
                                                          244/60
3,747,343 A    7/1973 Rosen
(Continued)

FOREIGN PATENT DOCUMENTS

EP           3 090 951 A1    11/2016
WO    WO 2013/186009 A1    12/2013
(Continued)

OTHER PUBLICATIONS

International Search Report and Written Opinion dated Jun. 15, 2018 for International Application No. PCT/US2018/23189, 11 pages.

*Primary Examiner* — Joseph W Sanderson
(74) *Attorney, Agent, or Firm* — Cooley LLP (57) ABSTRACT

Hybrid-electric aircraft and a series hybrid powertrain configured to power the aircraft for a medium-haul flight. The series hybrid power train includes a plurality of energy storage units, at least one range extending generator, and a plurality of electric propulsors, each coupled to a distribution bus. The electric propulsors can produce a maximum thrust of at least 15 MW. During a cruise regime, the hybrid-electric aircraft can have an airspeed of at least 0.7 Mach at an altitude of less than 32000 feet, and the plurality of electric propulsors can have a fan pressure ratio of between 1.15 and 1.19. The hybrid-electric aircraft can have a degree of hybridization of at least 25% for the medium-haul flight and carbon dioxide equivalent ($CO_2e$) well-to-wake greenhouse gas (GHG) emissions less than 0.25 lbs/ Available Seat Mile (ASM).

20 Claims, 9 Drawing Sheets

Related U.S. Application Data (60) Provisional application No. 62/473,446, filed on Mar. 19, 2017.

(51) Int. Cl.
  *B64C 29/00* (2006.01)
  *B64D 27/02* (2006.01)

(56) References Cited

U.S. PATENT DOCUMENTS

| | | |
|---|---|---|
| 3,987,279 A | 10/1976 | Borelan et al. |
| 4,005,575 A | 2/1977 | Scott et al. |
| 4,417,708 A | 11/1983 | Negri |
| 4,591,313 A | 5/1986 | Miyatake et al. |
| 4,925,132 A | 5/1990 | Zider |
| 4,968,216 A | 11/1990 | Anderson et al. |
| 5,205,712 A | 4/1993 | Hamilton |
| 5,209,640 A | 5/1993 | Moriya |
| 5,330,131 A | 7/1994 | Burcham et al. |
| 5,416,699 A | 5/1995 | DiValentin et al. |
| 6,070,407 A | 6/2000 | Newton |
| 6,748,744 B2 | 6/2004 | Peplow et al. |
| 6,994,360 B2 | 2/2006 | Kuang et al. |
| 7,032,861 B2 | 4/2006 | Sanders, Jr. et al. |
| 7,555,893 B2 * | 7/2009 | Okai ................. F01D 15/10 60/228 |
| 7,711,455 B1 | 5/2010 | Cogan |
| 7,883,051 B2 | 2/2011 | Sammy |
| 8,016,228 B2 | 9/2011 | Fucke et al. |
| 8,128,019 B2 | 3/2012 | Annati et al. |
| 8,201,774 B2 | 6/2012 | Gieras et al. |
| 8,393,564 B2 | 3/2013 | Kroo |
| 8,425,191 B2 | 4/2013 | Ali |
| 8,469,306 B2 | 6/2013 | Kuhn, Jr. |
| 8,500,064 B2 | 8/2013 | Bruno et al. |
| 8,636,241 B2 | 1/2014 | Lugg et al. |
| 8,662,445 B2 | 3/2014 | Bruno et al. |
| 8,684,304 B2 | 4/2014 | Burns et al. |
| 8,727,270 B2 | 5/2014 | Burns et al. |
| 8,727,271 B2 | 5/2014 | Salyer |
| 8,757,542 B2 | 6/2014 | Hopdjanian et al. |
| 8,798,810 B2 | 8/2014 | Delaplace et al. |
| 9,008,942 B2 | 4/2015 | Dyrla et al. |
| 9,045,223 B2 | 6/2015 | Connaulte et al. |
| 9,096,314 B2 | 8/2015 | Brotherton-Ratcliffe et al. |
| 9,102,326 B2 | 8/2015 | Anderson et al. |
| 9,174,741 B2 | 11/2015 | Suntharalingam et al. |
| 9,193,451 B2 | 11/2015 | Salyer |
| 9,194,285 B2 | 11/2015 | Botti et al. |
| 9,206,710 B2 | 12/2015 | Gurin |
| 9,212,625 B2 | 12/2015 | Shelley |
| 9,296,288 B2 | 3/2016 | Galbraith |
| 9,334,049 B1 | 5/2016 | LeGrand, III et al. |
| 9,425,670 B2 | 8/2016 | Mariotto |
| 9,493,245 B2 | 11/2016 | Salyer |
| 9,561,860 B2 * | 2/2017 | Knapp ................. G08G 5/0034 |
| 9,598,169 B1 | 3/2017 | LeGrand, III et al. |
| 9,623,978 B2 | 4/2017 | Anton et al. |
| 9,643,729 B2 * | 5/2017 | Walter-Robinson ... B64D 41/00 |
| 9,950,801 B2 * | 4/2018 | Viala ................. B64D 27/02 |
| 10,017,266 B2 * | 7/2018 | Phan ................. B64D 27/10 |
| 10,131,441 B2 * | 11/2018 | Edwards ............. B64D 27/24 |
| 10,501,194 B2 * | 12/2019 | Knapp ................. G08G 5/0034 |
| 11,104,444 B2 | 8/2021 | Knapp et al. |
| 2003/0062449 A1 * | 4/2003 | Sankrithi ........... B64D 11/0601 244/118.6 |
| 2006/0254255 A1 * | 11/2006 | Okai ................. F02K 3/06 60/226.1 |
| 2007/0126292 A1 * | 6/2007 | Lugg ................. F01D 5/03 310/11 |
| 2008/0175703 A1 | 7/2008 | Lugg |
| 2011/0147533 A1 | 6/2011 | Goossen et al. |
| 2012/0056040 A1 | 3/2012 | Brotherton-Ratcliffe et al. |
| 2013/0000273 A1 | 1/2013 | Roberge et al. |
| 2013/0062455 A1 | 3/2013 | Lugg et al. |
| 2013/0147204 A1 | 6/2013 | Botti et al. |
| 2013/0261914 A1 | 10/2013 | Ingram et al. |
| 2014/0010652 A1 | 1/2014 | Suntharalingam et al. |
| 2014/0060005 A1 | 3/2014 | Lugg |
| 2014/0257599 A1 | 9/2014 | Kobayashi et al. |
| 2014/0346283 A1 | 11/2014 | Salyer |
| 2014/0367510 A1 * | 12/2014 | Viala ................. B64C 1/26 244/62 |
| 2015/0050123 A1 | 2/2015 | Lugg |
| 2015/0151844 A1 | 6/2015 | Anton et al. |
| 2015/0260051 A1 * | 9/2015 | Gallagher ............ F01D 9/04 415/144 |
| 2016/0009388 A1 * | 1/2016 | Brotherton-Ratcliffe .................... B64C 29/0016 244/17.13 |
| 2016/0016670 A1 | 1/2016 | Sautreuil et al. |
| 2016/0023773 A1 | 1/2016 | Himmelmann et al. |
| 2016/0236790 A1 * | 8/2016 | Knapp ................. B64C 11/44 |
| 2016/0244158 A1 * | 8/2016 | Fredericks ............ B64C 25/52 |
| 2016/0325629 A1 | 11/2016 | Siegel et al. |
| 2016/0375994 A1 | 12/2016 | Rossotto |
| 2017/0190434 A1 * | 7/2017 | Dong ................. H02M 5/458 |
| 2017/0203839 A1 | 7/2017 | Giannini et al. |
| 2017/0210481 A1 | 7/2017 | Bak et al. |
| 2018/0037333 A1 * | 2/2018 | Willford .............. F02C 6/206 |
| 2018/0079516 A1 * | 3/2018 | Phan ................. B64D 27/24 |
| 2018/0155040 A1 * | 6/2018 | Armstrong ........... H02K 7/1823 |
| 2020/0182637 A1 | 6/2020 | Kumar et al. |
| 2020/0346769 A1 * | 11/2020 | Knapp ................. G08G 5/0021 |

FOREIGN PATENT DOCUMENTS

| | | |
|---|---|---|
| WO | WO 2014158240 A2 | 10/2014 |
| WO | WO 2016/049027 A1 | 3/2016 |
| WO | WO 2017/025224 A1 | 2/2017 |
| WO | WO 2017/098144 A1 | 6/2017 |

* cited by examiner

Example powertrain architecture for a 100 seat aircraft with 3 propulsors and 1 gas turbine generator.

HYBRID-ELECTRIC AIRCRAFT, AND METHODS, APPARATUS AND SYSTEMS FOR FACILITATING SAME

CROSS REFERENCE TO RELATED APPLICATIONS

This application is a continuation of International Application No. PCT/US2018/023189, filed Mar. 19, 2018, which claims the benefit of U.S. Provisional Patent Application No. 62/473,446 entitled Methods, Apparatus and Systems for Facilitating Implementation of Hybrid-Electric Aircraft and Vertical and/or Short Take-Off and Landing (VTOL/VS-TOL) Aircraft, filed on Mar. 19, 2017, the entire disclosures of each of which is incorporated herein by reference. This application has been printed as U.S. Patent Application Pub. No. 2020/0290742, the entire contents of which are hereby incorporated by reference.

BACKGROUND

Figure 1:
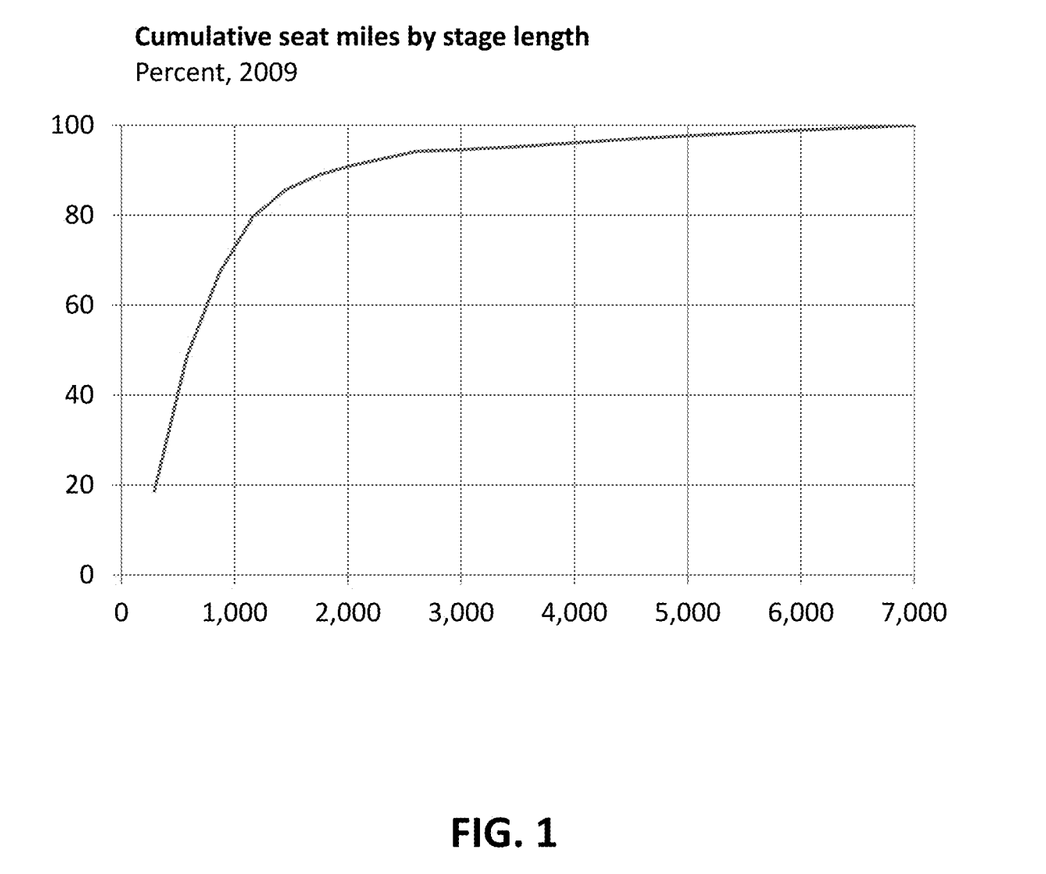
FIG. 1 shows cumulative seat miles by range from 2009 travel data.

As illustrated in FIG. 1, the large fraction of commercial aircraft flights are less than 1,500 miles; in particular, more than 90% of high-traffic scheduled flights are less than 1,500 nautical miles (nm) (see, G. K. W. Kenway et al, Reducing Aviation's Environmental Impact Through Large Aircraft For Short Ranges, 48th AIAA Aerospace Sciences Meeting, 2010). This phenomenon extends to business jets as well; for example, nearly 70% of Gulfstream G450 domestic flights in the US in 2011 were to stages under 1,150 miles (Table 1).

TABLE 1

Percent cumulative distribution of US operations of a sample regional jet (E190), single aisle airliner (A320) and business jet (G450), 2011.

| Nm | E190 | A320 | G450 |
|---|---|---|---|
| 750 | 65 | 36 | 57 |
| 1,000 | 86 | 58 | 69 |

Figure 2:
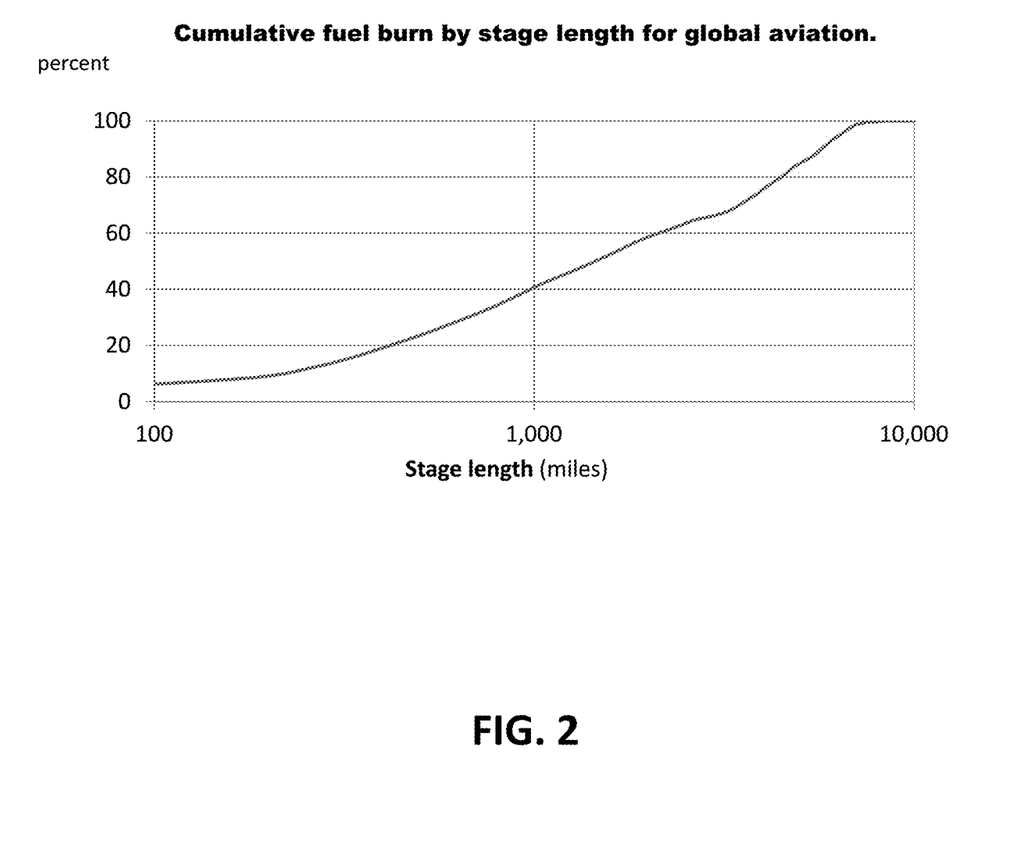
FIG. 2 shows cumulative fuel burn by stage length for global aviation.

In spite of the foregoing, a majority of conventional commercial aircraft are designed for considerably longer flight ranges, even though large fractions of their flights are on stages less than 1,500 miles. In particular, driven by the range-independent performance of the gas turbines used in these aircraft, conventional commercial aircraft are designed for optimal performance at long ranges, typically over 3,500 miles. The higher maximum take-off weight and cruise speed requirements given aircraft designed for longer ranges translate to a higher operating empty weight, and in turn, to a higher induced drag and fuel burn. As a result, as illustrated in FIG. 2, as much as 50% of global greenhouse gas emissions ("fuel burn") generated by conventional commercial aircraft arises from sub-1,500 mile flight stages.

The foregoing illustrates that, in the global mobilization to mitigate the planetary threat of climate change, aviation has long been a prominent outlier. In view of the foregoing, in 2016 the National Academies of Sciences, Engineering and Medicine published recommendations on a 30-year national research agenda to reduce emissions from commercial aviation (see "Commercial Aircraft Propulsion and Energy Systems Research: Reducing Global Carbon Emissions," National Academies of Sciences, Engineering and Medicine, 2016, hereafter "the NASEM report").

The NASEM report was prepared by a committee of leading experts based on request by the National Aeronautics and Space Administration (NASA) to develop a national research agenda for propulsion and energy systems research to reduce emissions from commercial aviation. The committee met in 2015 and 2016 to identify high-priority research projects that could be introduced into service over the next 10 to 30 years. Amongst its recommendations, the report focuses significantly on turboelectric propulsion systems, i.e. using electric generators to convert the mechanical energy of a gas turbine into electric energy, and electric motors to convert it back into mechanical energy for propulsion). The report states that "turboelectric propulsion systems are likely the only approach for developing electric propulsion systems for a single-aisle passenger aircraft that is feasible in the time frame considered by this study." The report also states that "turboelectric propulsion systems, in concert with distributed propulsion and boundary layer ingestion, have the potential to ultimately reduce fuel burn up to 20 percent or more compared to the current state of the art for large commercial aircraft." And that "the committee is not aware of any system studies showing that hybrid systems would reduce emissions more than turboelectric systems."

SUMMARY

In direct contrast to the recommendations and findings of the NASEM report, the Inventors have recognized and appreciated that hybrid-electric aircraft (which may be operated in an all-electric regime) provide viable alternatives to aircraft employing turboelectric propulsion systems, so as to realize a significant reduction in emissions from commercial aviation. More specifically, various examples of the inventive methods, apparatus and systems described in detail below relate to a hybrid-electric single-aisle aircraft that achieves significant reduction of emissions compared to conventional commercial aircraft on a majority of representative flights—and even greater emissions reductions than those postulated for aircraft employing turboelectric propulsion systems.

In other work (International Patent Cooperation Treaty Application No. PCT/US2015/047290, the entire contents of which are incorporated by reference), the Inventors described various inventive air transportation systems, apparatuses, and methods based in part on aircraft that employ a hybrid-electric powertrain. In various aspects, these systems, apparatuses and methods involved a forward-compatible (also referred to as "future-proofed"), range-optimized aircraft design that enables an earlier impact of electric-based air travel services as the overall transportation system and associated technologies are developed. Other inventive aspects included platforms for the semi-automated optimization and control of the hybrid-electric powertrain, and for the semi-automated optimization of determining flight paths for hybrid-electric aircraft, with particular examples based on regional or "short-haul" flight stages (e.g., flight distances up to approximately 1000 miles).

The present disclosure provides inventive details of aircraft designs not only for short-haul or regional flight stages, but also for medium-haul flight stages (e.g., from approximately 1000 miles to 3500 miles) and considerations for designs suitable for long-haul flight stages (e.g., greater than 3500 miles), based in part on the inventive principles disclosed in International Patent Cooperation Treaty Application No. PCT/US2015/047290, the entire contents of which are incorporated by reference. The present disclosure also contemplates further application of the inventive principles disclosed in PCT/US2015/047290 to vertical and/or short take-off and landing (VTOL/VSTOL) aircraft. In various aspects, the inventive methods, apparatus and systems disclosed herein in part rely on the "range-optimized" and "forward-compatible" concepts disclosed in PCT/US2015/047290 as applied to medium-haul, long-haul, and VTOL/VSTOL use-cases. In other aspects, the inventive methods, apparatus and system disclosed herein in part rely on example electric propulsor designs as set forth in PCT/US2015/047290 of this application.

It should be appreciated that all combinations of the foregoing concepts and additional concepts discussed in greater detail below (provided such concepts are not mutually inconsistent) are contemplated as being part of the inventive subject matter disclosed herein. It should also be appreciated that terminology explicitly employed herein that also may appear in any disclosure incorporated by reference or in the appendices attached hereto should be accorded a meaning most consistent with the particular concepts disclosed herein.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

DETAILED DESCRIPTION

Following below are more detailed descriptions of various concepts related to, and embodiments of, inventive methods, apparatus and systems for facilitating implementation of hybrid-electric (including all-electric operation) and VSTOL aircraft. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Range-optimized hybrid-electric aircraft powered by a series hybrid powertrain offer several advantages to conventional commercial aircraft including, but not limited to: significantly lower operating costs, quiet and short take-off capabilities for close-in flight envelopes to communities and urban centers, significantly lower emissions and significantly greater reliability. The magnitude of the operating cost and emissions reduction is driven by the extent to which energy is sourced from energy storage units of the aircraft (e.g., battery packs) as opposed to fuel-burning energy sources (e.g., range-extending generators). To quantify the relative use of stored energy as part of the overall energy consumption of the aircraft, the "degree of hybridization" (DOH) is defined as the ratio of the stored energy used divided by the total energy required for a flight.

In various aspects, the inventive hybrid-electric aircraft disclosed herein deliver the most significant reductions in operating cost and emissions over flight stage distances where this ratio is high (>25%) and the aircraft operates in a strong hybrid-electric regime to all-electric regime (i.e., DOH=100% for flight stage distances over which the energy storage units provide 100% of the energy for the flight). Over longer flight stage distances the aircraft may be defined as operating in a mild hybrid regime (e.g., DOH<25%), with a turboelectric regime as a limiting case (e.g., in which the use of stored energy is insignificant, DOH=0).

Figure 3:
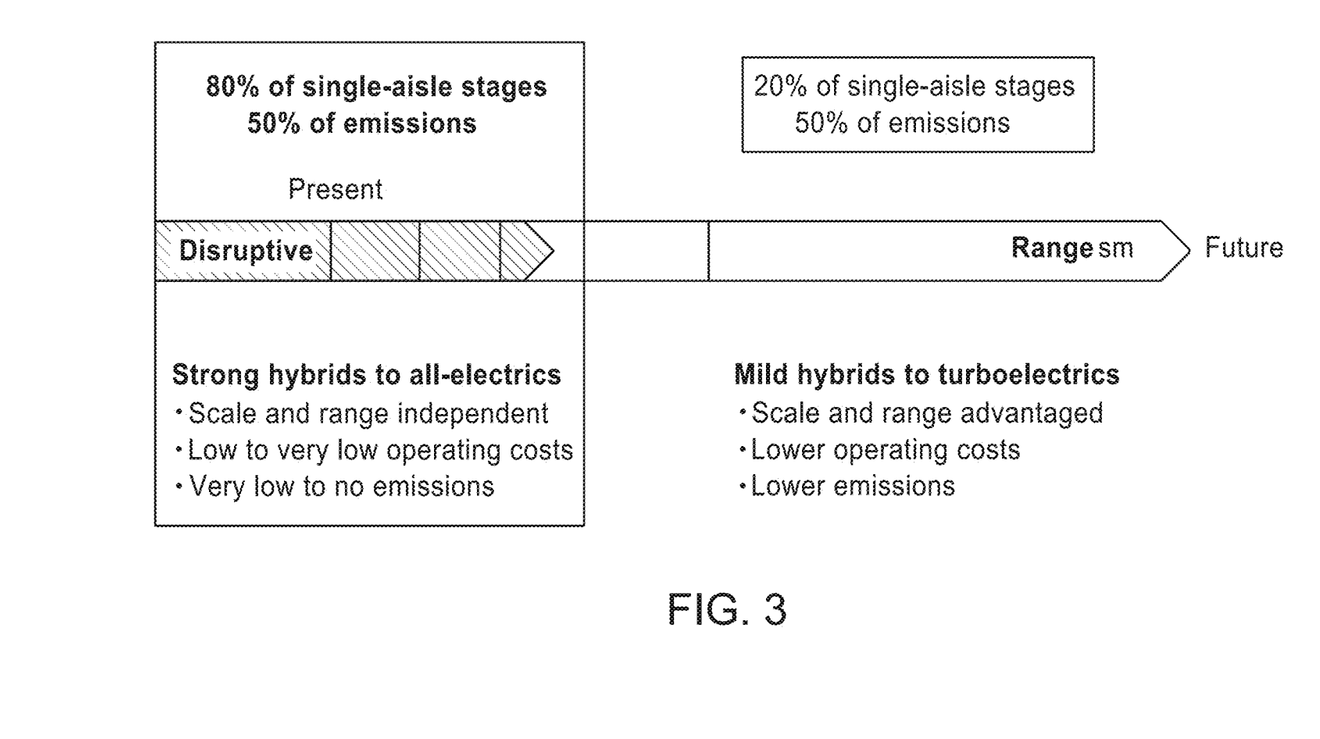
FIG. 3 is a graph illustrating a growing "disruptive range" of flight stage distances as a function of time, for which short-haul and medium-haul hybrid-electric aircraft according to the inventive principles disclosed herein are applicable.

For purposes of the present disclosure, the Inventors have defined a "disruptive range" for inventive hybrid-electric aircraft as a range of flight distance stages for which the DOH>25%. FIG. 3 is a graph illustrating a growing "disruptive range" of flight stage distances as a function of time, for which short-haul and medium-haul hybrid-electric aircraft according to the inventive principles disclosed herein are applicable. Given the rapid improvement of energy storage technologies, this disruptive range is forecast to expand over time, reaching 1,500 miles by 2035, as shown in FIG. 3. Based on this evolving disruptive range, the Inventors have contemplated a range-optimized and future-compatible hybrid-electric aircraft design process (see International Patent Cooperation Treaty Application No. PCT/US2015/047290, the entire contents of which are incorporated by reference).

When the design principles for hybrid-electric aircraft disclosed in PCT/US2015/047290 are contemplated for the lower maximum take-off weight and cruise speeds of short-haul and medium-haul flight distance stages, as opposed to the "one size fits all" paradigm of conventional aircraft design today, the impact of cost and emissions reduction is striking. For example, as discussed in greater detail below, hybrid-electric single aisle aircraft designed for intra-continental ranges (e.g., 2,200 miles US coast-to-coast) operate at 15% to 45% lower cost, 50% to 100% lower fuel burn, and 40% to 100% lower emissions over their disruptive ranges than their conventional counterparts. Given optimal speeds from Mach 0.68 to 0.72 versus Mach 0.78 for conventional airliners, flight times for these hybrid-electric aircraft are only modestly longer and at comparable altitudes. The impact for single aisle aircraft designed for shorter ranges is greater, and the impact for regional and business jets is far greater still (given the much lower efficiency of the gas turbines being replaced).

Thus, range-optimized hybrid-electric aircraft enable a significant reduction in emissions without any need for green incentives, given the appreciably lower operating costs of the hybrid-electric aircraft as compared to conventional aircraft. Moreover, these significant reductions in emissions can be extended to longer ranges via "intermediate stop operations," whereby long flights are conducted in multiple stages with one or more recharge and refueling stops in between. Given the excess fuel carried on long flights, this equates to an added reduction in operating costs and emissions over the very significant benefits seen in the shorter and intermediate ranges.

In other examples, hybrid-electric aircraft may be designed for vertical or short take-off (VSTOL) or vertical take-off (VTOL), to achieve significantly lower operating costs, emissions, and noise, and improved reliability, relative to their conventional analogues. As discussed in greater detail below, in one example implementation forward propulsors are vectored and supplemented with stowable lift fans, ducted or otherwise, to minimize drag in cruise. The range-optimized and forward-compatible design methods then lead to appropriately-adjusted sizing of the wing and hybrid-electric powertrain versus conventional or short-take off aircraft. The range-optimized and forward-compatible hybrid-electric VSTOL or VTOL aircraft similarly offer significant operating cost reduction (e.g., 50-60% lower) and emissions reduction (over 70% lower) as compared to their conventional analogues. Moreover, the low-maintenance hybrid-electric powertrain coupled with very low fuel needs for inventive VSTOL and VTOL aircraft according to the principles disclosed herein make these aircraft well-suited for military, remote and hostile environments.

Range-Optimized, Forward-Compatible, Medium-Haul Hybrid-Electric Aircraft

With respect to the inventive principles disclosed in PCT/US2015/047290, in exemplary implementations an innovative 3-tier range optimization process is employed to size the aircraft wing, and determine the capacity and mass of the energy storage units and the output of the range-extending generator for maximum efficiency over the prescribed ranges and speeds (e.g., see FIG. 13 of PCT/US2015/047290 and the associated text).

Applying these methods to a 100-seat medium-haul aircraft according to the inventive principles of the present disclosure, a first step of the design process is to define a 3-tier set of ranges and speeds, as shown in Table 2 below. Forward-compatible design is accomplished by defining the 3-tiers across the expected service timeline of the aircraft.

TABLE 2

Range optimization for a 100 seat airliner: 3-Tier ranges, speeds and altitudes with forward-compatibility

| Range | distance (sm) | 2025 cruise speed (Mach) | cruise altitude (kft) | distance (sm) | 2040 cruise speed (Mach) | cruise altitude (ft) |
|---|---|---|---|---|---|---|
| A electric | 250 | 0.7 | 18-30 | 500 | 0.7 | 25-35 |
| B disruptive | 1035 | 0.7 | 27-36 | 1350 | 0.73 | 29-39 |
| C extended | 2200 | 0.66 | 29-33 | 2200 | 0.72 | 29-39 |

In Table 2, for each of range A (electric), B (disruptive) and C (extended), a maximum flight stage distance for the range is defined as a function of time (e.g., in 2025, and in 2040). As discussed above, the "disruptive range" represents flight stage distances for which the degree of hybridization (DOH) for the aircraft is greater than 25%. Maximum cruise speed is chosen to match the disruptive range (B); the typical mid-lift cruise speed of M 0.72 is sufficient to accomplish the majority of flights within this range in under two hours while taking advantage of the lower Mach number (as opposed to M 0.78 for conventional single aisle aircraft) to leverage state-of-the-art in natural laminar flow (NLF) on a low sweep wing, for a lighter, lower drag aircraft.

As recognized and appreciated by the Inventors, the selection of cruise altitude for the range-optimized hybrid-electric aircraft does not adhere to conventional rules of flying at the maximum available altitude to maximize efficiency. In particular, when seeking to maximize the disruptive range (e.g., increase the largest flight stage distance for which DOH>25%), cruising at lower altitudes enables either a 5-10% smaller generation engine for a fixed disruptive range requirement, or an 3-5% longer disruptive range with the same generation engine. The lower cruise altitude increases available generation power from a gas turbine generation engine with altitude-dependent lapse rate. This non-intuitive result is due to altitude-independent propulsion efficiency of the variable-pitch electrically-driven ducted fan, and the gas turbine generation reaching peak efficiency at lower altitudes than a conventional high bypass turbofan.

The innovative aircraft design process described in PCT/US2015/047290 considers an estimate of aircraft weight. As further recognized and appreciated by the Inventors, satisfactory performance of a 100-seat hybrid-electric aircraft suggests maximum takeoff weights of no more than 5-10% higher than conventional aircraft. Thus, for a 100-seat hybrid-electric aircraft according to the inventive principles disclosed herein, the maximum aircraft weight may be estimated at approximately 100,000 lbs. based on current aircraft designs.

The quiet electric propulsors are sized for the disruptive cruise speeds and altitudes given in Table 2, which results in a fan pressure ratio of 1.15-1.19. These ratios are closer to conventional high bypass turbofans, and higher than those discussed in PCT/US2015/047290 (e.g., 1.02 to 1.10). However, these pressure ratios are still lower than those for a conventional aircraft, via optimized motor-fan integration at lower rpms with variable pitch.

The methods described in PCT/US2015/047290 are used to size the electric propulsor motor-drive; this process results in lower shaft power required at the propulsor than in conventional aircraft due to the no-lapse electric drive, higher static thrust from the lower-pressure variable-pitch ducted propulsors, and thrust preservation on takeoff, which reduces balanced field length and results in three motors of 5.2 MW peak, 4.4 MW power output, each.

Continuing with the range-optimization process of PCT/US2015/047290, simulation models are constructed, and an objective function is defined for optimization over the 3-tier ranges and speeds given in Table 2 in the following sequence:

The wing is first range-optimized for minimum required mission energy with a takeoff and landing constraint of a 5000 ft. runway; and Stored energy mass, generation capacity, and fuel available are sized through iterative performance simulation as described in PCT/US2015/047290, and the process is repeated across the range of expected energy storage densities and generation efficiency levels.

Figure 4:
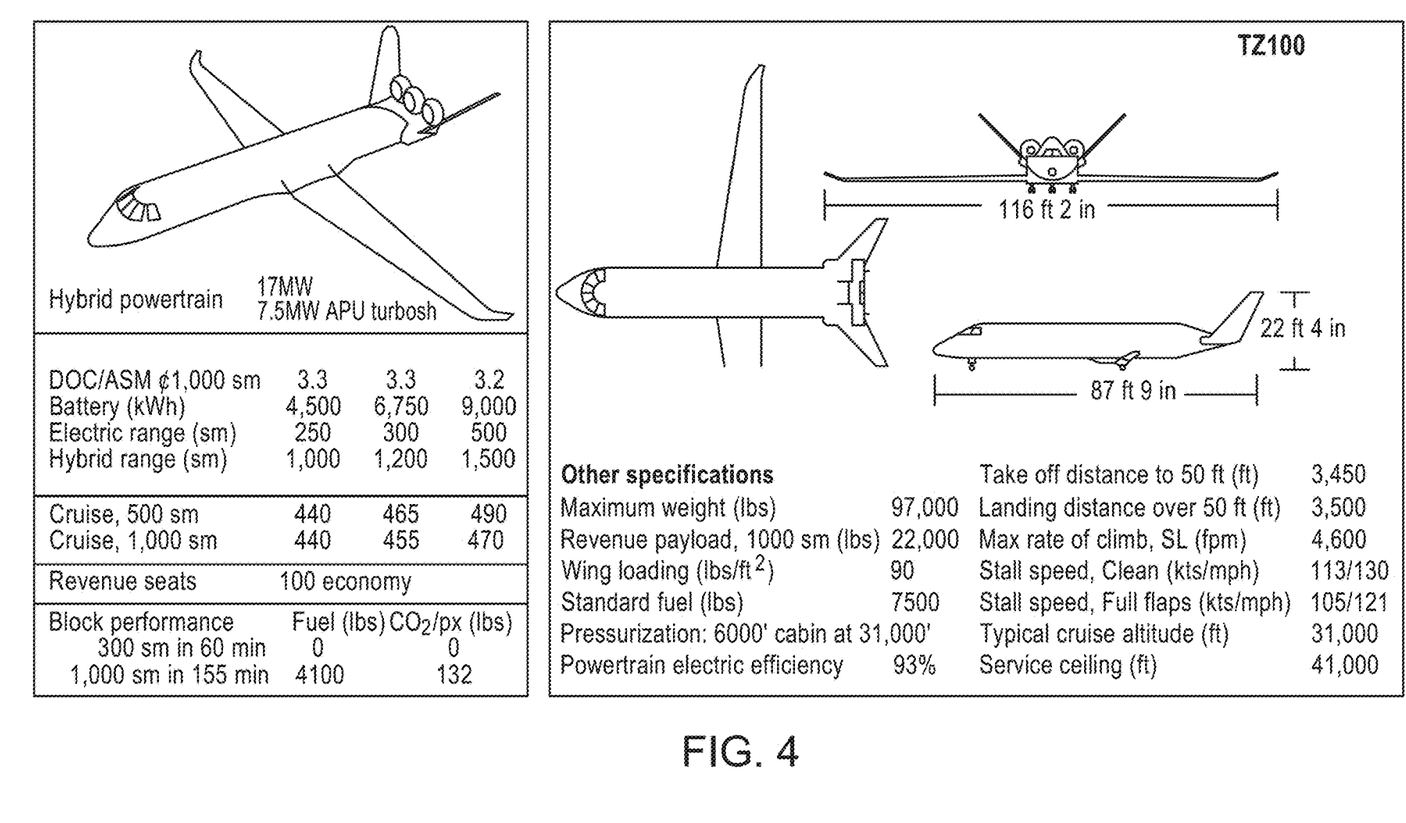
FIG. 4 illustrates an example of a 100-seat hybrid-electric aircraft according to the inventive principles disclosed herein.

The resulting aircraft and powertrain characteristics are shown in FIG. 4. An outcome of the process is the energy storage mass fraction of 21.6%; this is slightly higher than the 12-20% range given in PCT/US2015/047290, as would be expected for a longer range, higher speed aircraft.

Figure 5A:
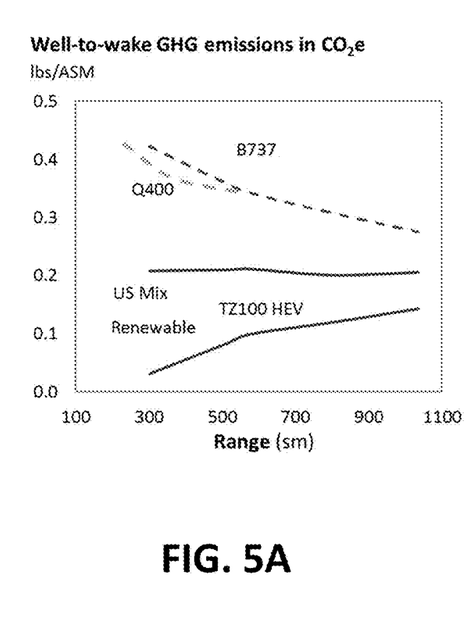
FIGS. 5A and 5B compares the performance of hybrid-electric aircraft according to the inventive principles disclosed herein with a "best-in-class" conventional B737 aircraft and a conventional Q400 regional turboprop aircraft.
Figure 5B:
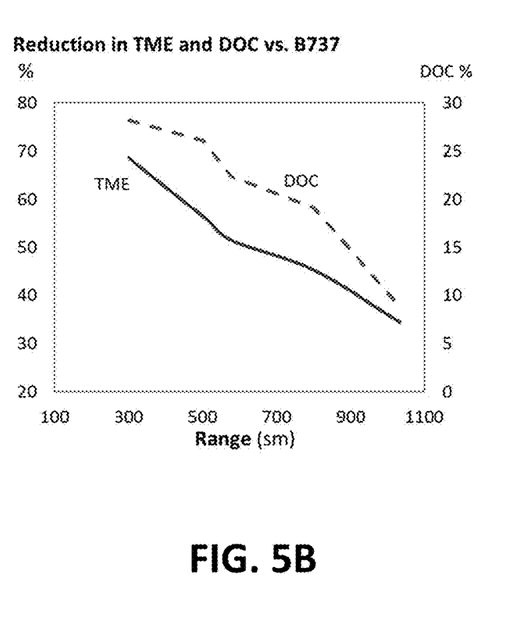

FIGS. 5A and 5B show performance comparisons of the hybrid-electric aircraft according to the inventive principles disclosed herein as exemplified by the aircraft in FIG. 4, with a "best-in-class" conventional B737 aircraft and a conventional Q400 regional turboprop aircraft. In particular, FIG. 5A shows a comparison of well-to-wake greenhouse gas (GHG) emissions for a B737 and Q400 aircraft (dashed lines) with the 100-seat aircraft of FIG. 4 (solid lines, labeled as TZ100 HEV in FIG. 5A). The two solid lines in FIG. 5A for the 100-seat aircraft of FIG. 4 respectively presume a "U.S. Mix" fuel-generated electricity used to charge the hybrid-electric aircraft (upper solid line) and renewable-generated electricity used to charge the hybrid-electric aircraft (lower solid line); in both instances, a significant reduction in GHG emissions can be seen on either basis for the 100-seat aircraft of FIG. 4. FIG. 5B illustrates the reduction in total mechanical energy (TME) and direct operating cost (DOC) as a function of flight stage distance (range in statute miles) for the 100-seat aircraft of FIG. 4 as compared to the B737.

Figure 6:
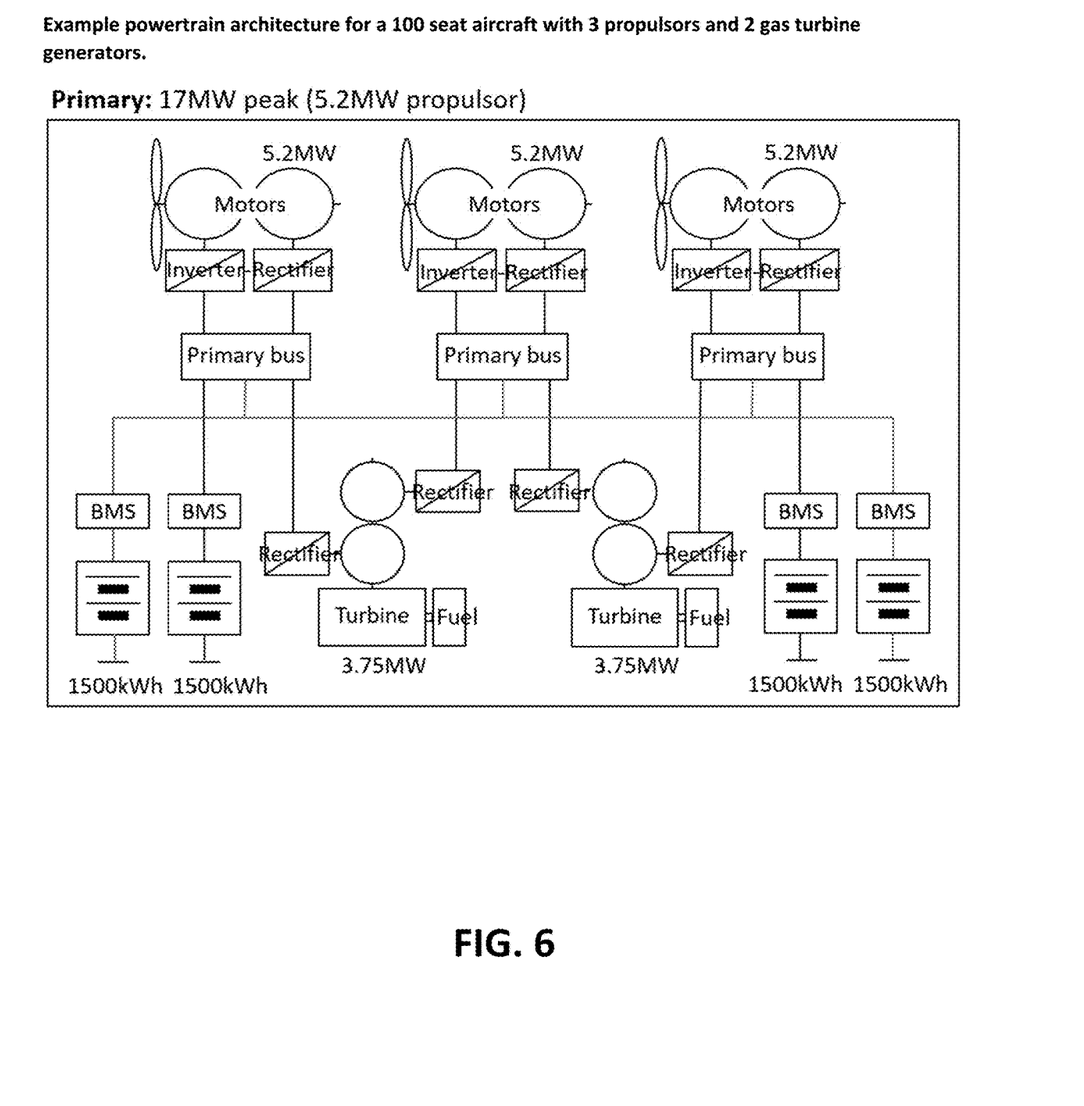
FIG. 6 illustrates an example of a hybrid powertrain architecture with two gas turbine generators for the hybrid-electric aircraft of FIG. 4, according to the inventive principles disclosed herein.
Figure 7:
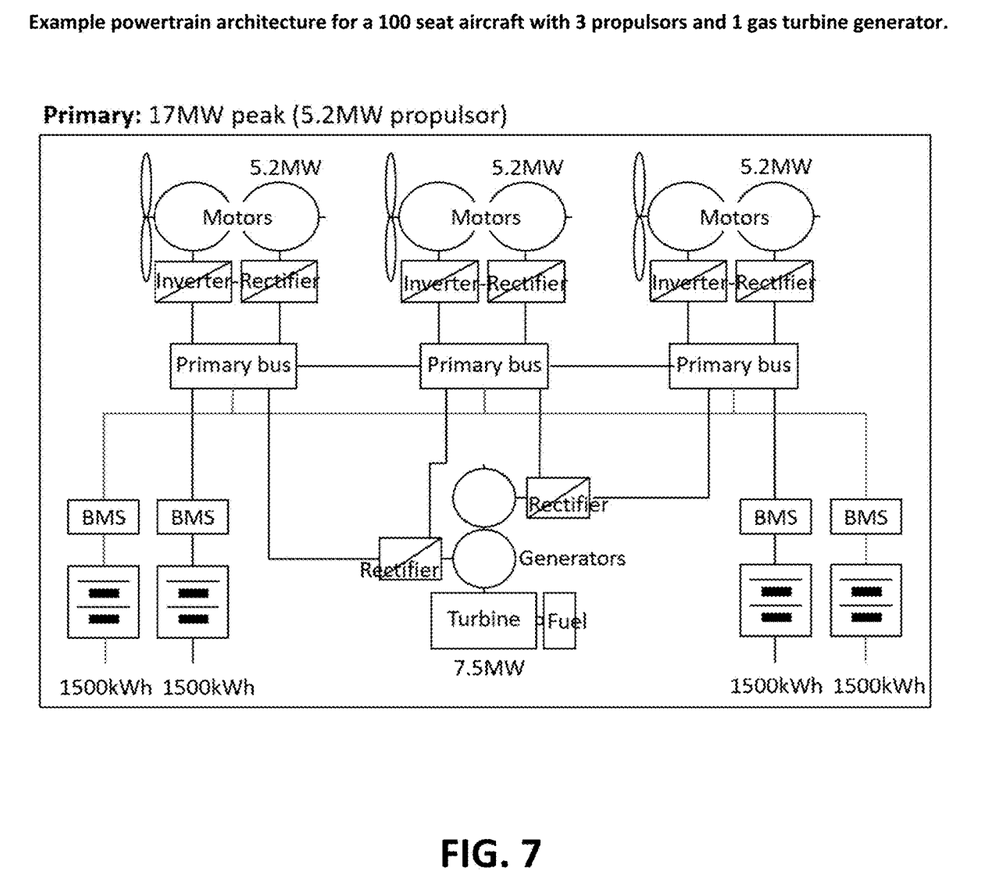
FIG. 7 illustrates an example of a hybrid powertrain architecture with one gas turbine generator for the hybrid-electric aircraft of FIG. 4, according to the inventive principles disclosed herein.

The aircraft as described in FIG. 4 utilizes two gas turbine generation engines as shown in the powertrain schematic of FIG. 6. However, as part of the design process, a trade can be made between two or more generation engines vs. a single, larger, and more efficient engine, as shown in FIG. 7, which requires an increase in stored energy reserves to maintain an equivalent level of safety. While the details of this trade will be specific to the aircraft type and operating environment, an example process is provided here for the 100-seat airliner in the current CFR 14 Part 25 regulatory environment.

Utilization of a single gas turbine generator requires an increase in the minimum stored energy reserve to ensure continued safe flight and landing following a failure of the generation turbine. The energy required is calculated in a two-step process: first the required battery-only flight distances are determined for each of the 3-tier ranges:

No modification to A range given no usage of generation, no failure mode;
  Over the B range, identify the worst case failure point; this was found to be a critical distance prior to the top of descent point on a flight where generation is used continuously in cruise and batteries are nearly depleted to minimum for nominal operations. As distance from the top of descent increases, battery remaining increases but less quickly than energy required; however additional airport options also increase. For the 1035 sm range in the described embodiment, the worst case failure point is 200 miles prior to the intended airport of arrival, and that airport is maintained as the final destination; and
  Over the C range, battery reserve is less, but also depletes more slowly. The same 200 sm range following failure is utilized for this flight given high likelihood of alternate airport within a 200 sm radius at any point in a flight.

In the second step, the total reserve energy required is calculated using simulation and is the sum of: a) energy required to reach the airport over a gradual drift-down profile at best range speed+b) energy to fly the runaway approach pattern and land+c) energy to execute a missed approach, circle back around, and execute a second landing to a full stop. It is assumed that the batteries will be depleted to their minimum voltage during the maneuver, below typical operations. At maximum range and generation use, additional storage reserves are a minimum of 10% above the nominally depleted pre-landing state to ensure safe completion of the flight to landing. For the aircraft in FIG. 4, this trade saves 6% in fuel burn, and requires a 21% increase in stored energy reserve. With a modular hybrid-electric powertrain, this additional reserve could be carried only on flights when required for safety.

When compared the mid-life performance of the aircraft of FIG. 4 to an emerging state of the art conventional equivalent, this combination of attributes provides: 10-35% reductions in DOC; 35-70% reductions in total mission energy; and 30-95% reductions in emissions, with low to zero emissions within airport terminal areas. As noted in PCT/US2015/047290, these benefits continue to improve over time with continued improvements in energy storage technology.

Note that the system and methods for range optimization from PCT/US2015/047290 and applied without modification resulted in an aircraft with the attributes of a strong hybrid, including a DOH of 25% at the outer extent of the disruptive range (B).

In other aspects, the inventive hybrid-aircraft design of FIG. 4 and similar implementations may be further characterized by additional features which improve system performance including, but not limited to:

Improved aerodynamics with natural laminar flow (NLF) on a low sweep wing;
  Fuselage aerodynamics leverage boundary layer ingestion (BLI) by the integrated aft propulsors, which also reduce vertical tail size with centerline thrust;
  The outer ring implementation of the electric propulsor motor-drive is utilized to further reduce nacelle ram drag by minimizing nacelle length, maximizing diffusion and BLI on the aft fuselage with the aft most possible location;
  BLI is further enhanced through utilization of three smaller fans with a higher fraction of the disk immersed in the boundary layer. As recognized by the Inventors, this is only feasible when utilizing fully electric propulsion since conventional turbofans may not be arranged in close proximity such due to disk failure burst requirements;
  Aft fuselage generation-propulsion configuration enables a simple and flexible integration with the powertrain, minimizes wire weights and EMI;
  Very low wing location for wing-integrated battery packs close to the ground for easy line access; and the landing gear is short, minimizing the higher MLW penalty;
  As noted in PCT/US2015/047290, the electric fans provide precise thrust control including regenerative braking, eliminating the need for spoilers, reducing approach noise and system weight;
  As noted in PCT/US2015/047290, additional noise benefits include airframe shielding of fan tonal noise (otherwise adversely affected by BLI), and an exceptionally quiet cabin due to aft propulsors and generators. In addition, the low sweep wing eliminates the need for a landing slat, also a significant noise source;
  As noted in PCT/US2015/047290, three propulsors near the centerline provide more benign failure modes than a single wing mounted engine, further enhanced by powertrain fault tolerance and graceful degradation; and As noted in PCT/US2015/047290, the fan integration shielding by the fuselage and tail surfaces results in 15 to 20 EPNdB noise reduction below current (single observer).

Range-Optimized, Forward-Compatible, Long-Haul Aircraft

In yet other inventive implementations, the optimization is constrained by a minimum cruise speed for range (C), which results in a longer range (i.e., long-haul) aircraft with reduced savings. The modular nature of the hybrid-electric powertrain is then leveraged to increase generation size to meet the extended M 0.72 cruise, and the increased fuel requirement is offset with reduced energy storage resulting in an aircraft operating in the "mild hybrid" regime with a DOH<10% at the outer limit of the long-haul range.

Range-Optimized, Forward-Compatible VTOL Aircraft

In yet other inventive implementations, various principles disclosed in PCT/US2015/047290 are applied to range-optimize a forward-compatible Vertical Takeoff and Landing (VTOL) aircraft. The aircraft is configured for vertical flight with swiveling primary propulsion, and two supplemental, folding lift fans to minimize the cruise drag impact of the VTOL system. This configuration of only four lift points would normally result in a catastrophic loss of control following failure of any one propulsor. In one inventive implementation, the failure hazard is prevented by designing the powertrain for fault-tolerant operation with graceful degradation of thrust capability as described in PCT/US2015/047290. Fault detection and recovery are performed in real time by the Powertrain Optimization and Control System (POCS), also as described in PCT/US2015/047290, with the result that the powertrain may suffer a loss to any one component during hover without significant loss of thrust on any propulsor or loss of control.

The range optimization design cycle for the VTOL aircraft is conducted using the same process and methods of PCT/US2015/047290, as described above for the 100-seat airliner. The 3-tier range, speed and altitude requirements are given in Table 3; for this application, the forecast energy storage densities by the 2050 forward compatibility date result in transition to fully electric operation so that no extended range targets are specified.

TABLE 3

Range optimization for a VTOL aircraft: 3-Tier ranges, speeds and altitudes with forward-compatibility

| Range | distance (sm) | 2030 cruise speed (mph) | cruise altitude (kft) | distance (sm) | 2050 cruise speed (mph) | cruise altitude (ft) |
| --- | --- | --- | --- | --- | --- | --- |
| A electric | 275 | 320 | 12-24 | 900 | 350 | 15-30 |
| B disruptive | 550 | 320 | 15-24 | 1500 | 350 | 15-30 |
| C extended | 750 | 280 | 15-20 | n/a | n/a | n/a |

The range-optimization process of PCT/US2015/047290 is not modified for the VTOL capability; as compared to a conventional takeoff and landing aircraft, there are two changes to the constraints imposed on the optimization space: 1) The wing sizing constraint for takeoff and landing is removed resulting in a smaller wing sized for cruise only; and 2) the very high power requirements for hover in takeoff and landing always require stored energy in addition to the generation, resulting in a stored energy emergency reserve even on hybrid systems.

Figure 8:
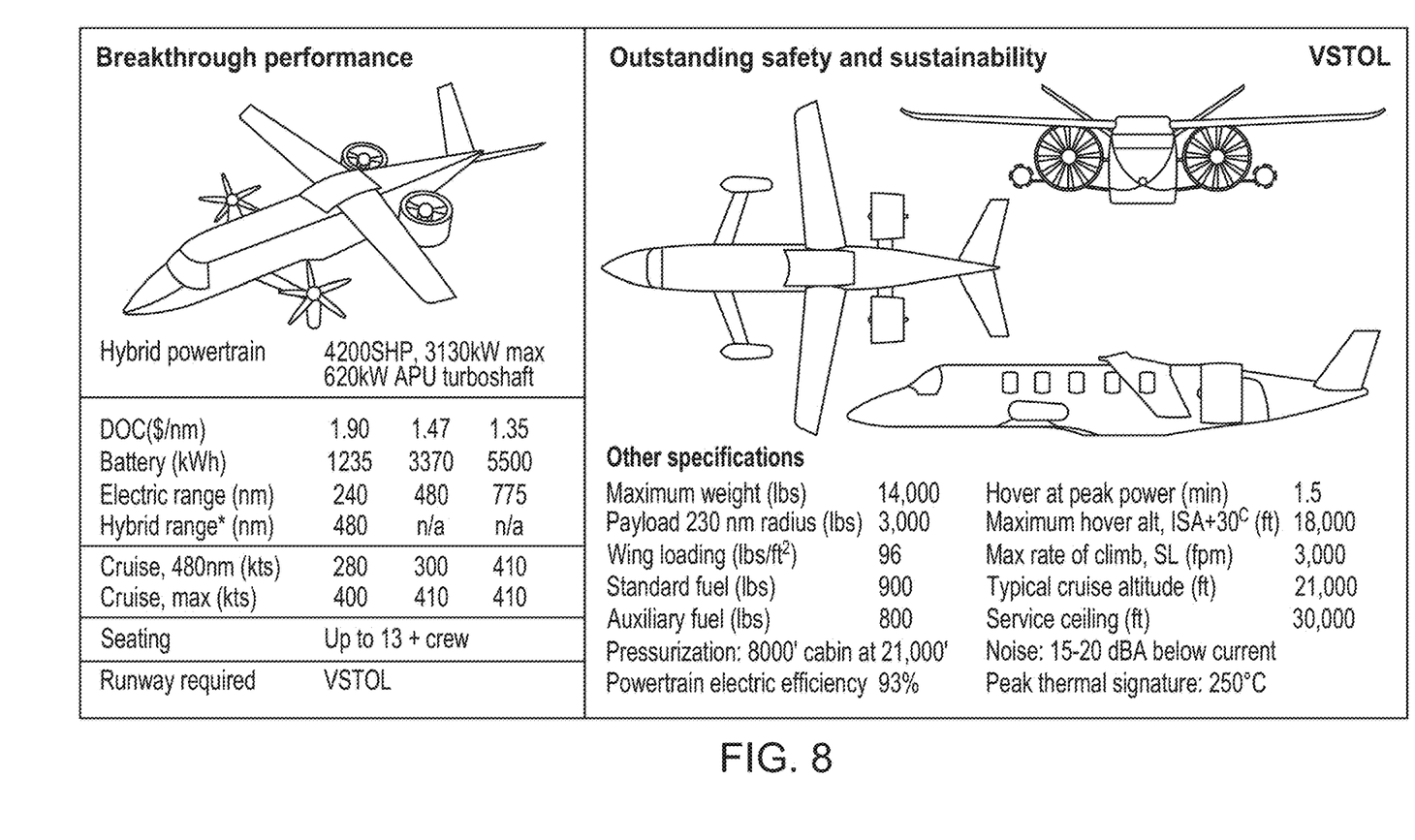
FIG. 8 illustrates an example of a VSTOL aircraft according to the inventive principles disclosed herein.

The resulting aircraft is shown in FIG. 8. Comparing performance to next generation compound rotor helicopters, the range-optimized hybrid VTOL provides 50-70% reductions in DOC and 65-80% reductions in fuel burn. As noted in PCT/US2015/047290, these benefits continue to improve over time with improvements in energy storage technology, including transition to full electric operation.

As further understood by the Inventors, the variations in configurations between VSTOL and VTOL, and Degree of Hybridization result in substantially different methods needed for the calculation of the required energy reserves and how those reserves are sourced. And further, that there is a critical distinction between air vehicles with lifting surface of sufficient size to allow a safe landing on a runway without the use of powered lift (VSTOL), as opposed to vehicles which must utilize significant powered lift to land (VTOL).

VSTOL aircraft, while capable of vertical flight, may also be configured to fly and land safely as a conventional aircraft on a standard runway. For this class of vehicle, the safety reserves may be calculated in the manner discussed in PCT/US2015/047290 as a function of generation power available:

For an aircraft in which generation power is sufficient for sustained flight and landing, required reserve energy may be stored entirely as fuel, allowing full depletion of stored energy at the completion of the planned flight for maximum efficiency. The amount of reserve fuel required is calculated as needed to meet the regulations pertaining to the aircraft type and class of operation, typically either a flight time or flight profile.

For an aircraft in which generation power is insufficient for sustained flight, the reserve is calculated as the sum of: a) the fuel needed to fly the required reserve time or flight profile, and b) the stored energy needed to supply all required flight power in excess of the generation power for the reserve flight time, or flight profile.

VTOL aircraft have insufficient aerodynamic lifting surfaces to allow a safe runway landing without powered lift. As is well known by those familiar with the art, a powered lift landing requires nearly maximum propulsion power output for a short, but sustained period of time, unlike a conventional runway landing flown at much lower power levels. For architectures where generation power is below required peak power, the stored energy units are utilized to provide the difference between peak and generation power. For these aircraft, the reserve is calculated as the sum of: a) the fuel needed to fly the required reserve time or flight profile, including a landing, and b) the stored energy needed to supply all required power in excess of the generation power for the reserve flight time, or flight profile, including a landing.

Quiet Electric Propulsors

PCT/US2015/047290 described quiet electric ducted fan propulsors of very low pressure ratio (1.02 to 1.10) for regional ranges and speeds. Electric ducted fans designed for higher cruise speeds and altitudes result in fan pressures ratios much closer to conventional bypass fans; 1.15-1.25 for medium-haul airline class aircraft, and as high as 1.5 for a high Mach, high altitude business aircraft applications. Any electrically-driven ducted fan propulsor of the form described in PCT/US2015/047290 may be designed with the pressure ratio needed for high efficiency cruise. The resulting system embodies exemplary benefits: net propulsive efficiencies greater than 80% with energy conversion efficiency greater than 70%; 15 to 25 dB lower noise than conventional propulsion alternatives; high static thrust for short runways; ultra-low to zero terminal area emissions; no altitude lapse for quick climbs; rapid thrust response for steep approaches; regenerative braking to replace spoilers; simplified reverse thrust for landing. And improved safety and strong thrust preservation given one or multiple high peak-power drives designed for fault-tolerance and graceful degradation.

The electric propulsor is an assembly comprised of an electric ring motor coupled with a fixed or variable pitch fan with a plurality of blades coaxially mounted inside a duct. The ring motor assembly provides the drive torque and in one implementation consists of an electric machine including a rotor and a stator, with the rotor affixed to the fan blade tips, and the stator affixed to the duct. The ring motor and fan assembly is supported by bearings at the outer or inner radius designed for quality gap, rotor to stator and fan to duct, to ensure high aerodynamic and electromechanical efficiencies. In other implementations, a ring motor is used to drive an annular or conventional fan at the inner radius.

Figure 9:
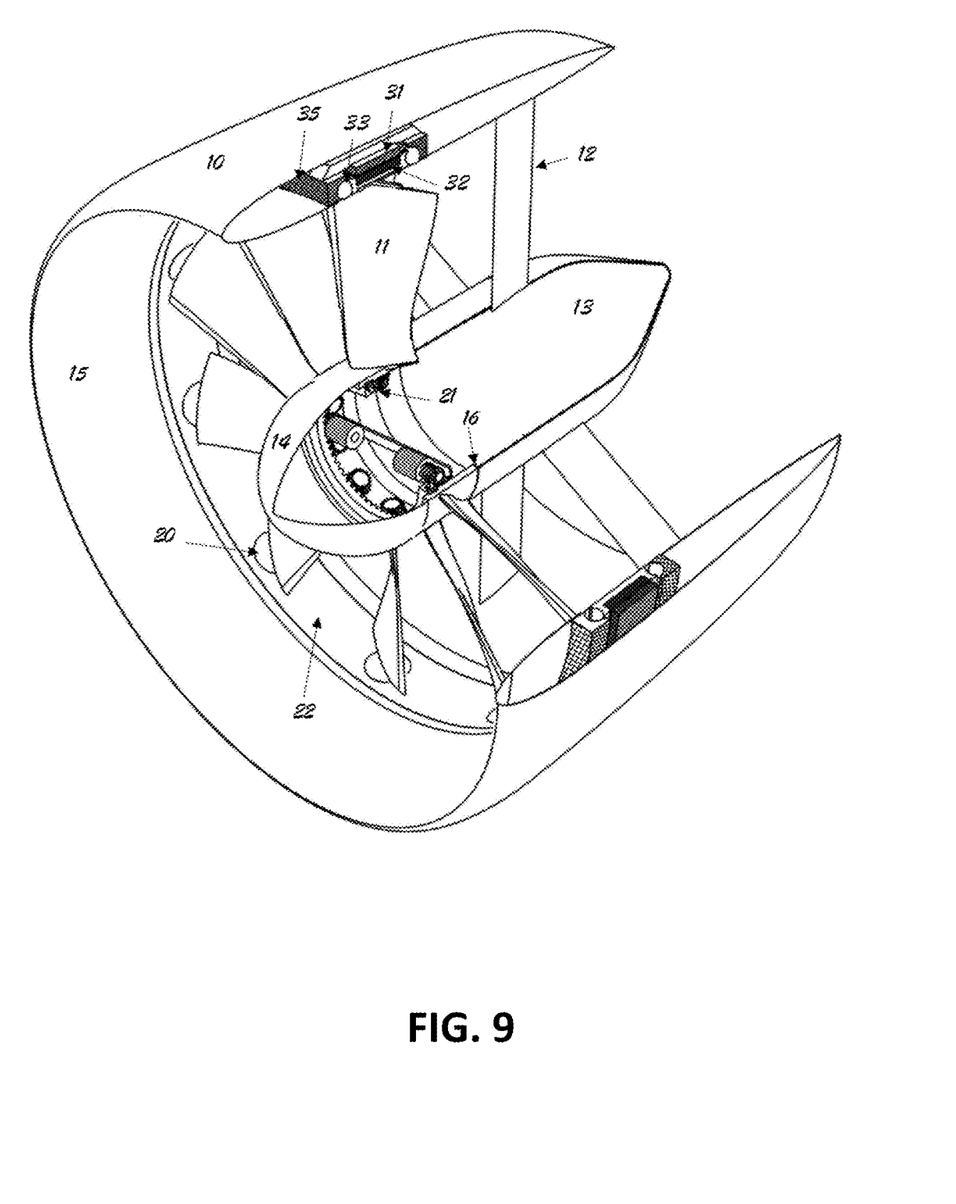
FIG. 9 is an isometric view with cut-away of the quiet electric propulsor fan, duct, and motor assembly.

FIG. 9 is an isometric view of one embodiment with a ring motor at the outer radius. As recognized by the inventors, maintaining the gap between motor rotor and stator 38 is critical to efficient motor operation. The construction of the rotating structural ring 22 utilizes a high modulus material, such as carbon fiber composites, which at the optimal rotating speeds for a ducted fan of 2000-4000 rpm, limits radial deformation to a fraction of the gap width. In this implementation, the rotor is supported by caged roller bearings 33 with the bearing cage attached to the fixed structure 35 and the matching race formed by the rotating motor structure 22. While this implementation uses physical bearings, magnetic, or fluidic bearings (e.g. air bearings) are also within scope of the invention.

The motor stator (windings or magnets) 31 are affixed to the primary support structure 35 through the periodic cross-tie members 39. The fixed structural rings 35 provide the attach points for integrating the motor with airframe. As recognized by the inventors, the concentration of masses and loads along the rotational plane of the fan, supported by rings with high structural moments of inertia, results in a very light, structurally efficient propulsor unit.

The fan blades may be actuated to vary the blade pitch angle to the oncoming flow in flight. Blade connections to the outer propulsion ring, and inner hub ring are made such that the blade may rotate around its longitudinal axis (fan radial direction). A mechanism within the hub including a drive motor and a system of gears rotates all fan blades simultaneously.

Ring motor designs offer higher power densities and greater opportunities for lightweight air cooling. They also translate to a much stiffer structure than conventional center mounted configurations, delivering higher propulsive efficiencies without the weight penalty of the stiffening otherwise required to maintain a small tip gap. In the case of a ring motor driving an annular fan at the outer radius, high quality tip gaps are maintained via bearings, mechanical, air, magnetic or other at the outer or inner radius. The lower stiffness of a ring motor driving at the inner radius is still significantly higher than that of a conventional center mounted drive. Additional benefits include significantly reduced duct and stator structures given much lower mass suspended within the duct, fan and stators less compromised by structural requirements, and simpler rotating variable pitch mechanisms contained within the radius of the ring motor.

In one implementation, a single propulsion fan is followed by a fixed stator coaxially located within the duct. In another implementation, multiple propulsion fans are located sequentially within the duct, and which alternate in direction of rotation. In a third implementation, the electric ring drive motors are utilized to drive an open propeller, or high speed open rotor.

Additional Features

PCT/US2015/047290 described a variety of inventive methods, apparatus and systems (collectively "inventive principles") that extend to the aircraft examples described herein.

One such inventive principle is the regional air transport network which may include 4-classes of airports, most with runways >1,500 ft (or pads for VTOL aircraft), and differentiated based on their respective role in the regional network and the degree to which they are equipped to support high-frequency hybrid-electric flights: Regional tier I, II and III airports, and Mainline large hubs in-region. Like conventional airliners, the large (>90 seats) range-optimized hybrid to all-electric aircraft are more likely to operate to the mainline hubs and regional tier I airports that have runway and other services to support the volume of passengers. As described in PCT/US2015/047290, these would be equipped with relatively fast recharge and swap stations tailored for the needs of the larger aircraft. The mainline hubs together with regional tier I airports accessible by large hybrid to all-electric aircraft collectively define a continental air system that can be served by the aircraft via direct or intermediate stop operations. Range optimized strong hybrid to-all electric VSTOL aircraft, on the other hand, will access the entire range of airports via runways or VTOL pads.

Other inventive principles that may apply to the inventive aircraft examples disclosed herein include the energy storage units, comprised of battery packs, supercapacitors, or other media for storing electrical energy (or a combination thereof), coupled with battery management systems that manage operation and safety of the packs. Each pack may comprise of multiple individually removable battery modules, and operate either with some or all of these modules in place.

Yet other inventive principles that may apply to the inventive aircraft examples disclosed herein include the powertrain optimization and control system (POCS), the Flight Path Optimization Platform (FPOP) and the Recharge and Refuel Platform (RRP).

What is claimed is:

1. A hybrid-electric aircraft, comprising:
   at least 100 seats in a single-aisle configuration; and
   a series hybrid powertrain to power the hybrid-electric aircraft for medium-haul flight having a design range of at least 1,000 miles, the series hybrid powertrain comprising:
      a plurality of energy storage units having an onboard stored energy of at least 1,500 kWh;
      a distribution bus coupled to the plurality of energy storage units;
      at least one range extending generator coupled to the distribution bus to generate onboard generated power of at least 7.5 MW; and
      at least three electric propulsors, coupled to the distribution bus, each electric propulsor of the at least three electric propulsors producing a thrust power of at least 3.3 MW to fly the hybrid-electric aircraft with a cruise speed of at least 0.7 Mach and a fan pressure ratio of between 1.15 and 1.19 at the cruise speed of at least 0.7 Mach, each of the at least three electric propulsors producing a maximum thrust power of at least 4.3 MW;

wherein:
a degree of hybridization for the series hybrid powertrain, given by a ratio of energy expended from the plurality of energy storage units to a total amount of energy consumed by the at least three electric propulsors during the medium-haul flight having the range of at least 1,000 miles, is at least 25%; and
carbon dioxide equivalent ($CO_2e$) well-to-wake greenhouse gas (GHG) emissions of the series hybrid powertrain are less than 0.25 lbs/Available Seat Mile (ASM).

2. The hybrid-electric aircraft of claim 1, wherein each electric propulsor from the plurality of electric propulsors includes a variable pitch ducted fan.

3. The hybrid-electric aircraft of claim 2, wherein the plurality of energy storage units are divided into at least three banks of energy storage units, each bank of energy storage units having an energy storage capacity of at least 1,500 kWh.

4. The hybrid-electric aircraft of claim 1, wherein the plurality of energy storage units have a specific energy of at least 250 Wh/kg.

5. The hybrid-electric aircraft of claim 1, wherein a maximum weight of the aircraft is less than 100,000 pounds.

6. The hybrid-electric aircraft of claim 5, wherein an energy storage mass fraction of the aircraft is at least 21%.

7. The hybrid-electric aircraft of claim 1, wherein the at least one range extending generator coupled to the distribution bus includes at least two range extending generators to generate the onboard generated power of at least 7.5 MW.

8. A hybrid-electric aircraft, comprising:
at least 100 seats in a single-aisle configuration; and
a series hybrid powertrain to power the hybrid-electric aircraft for a medium-haul flight having a design range of at least 1,000 miles, the series hybrid powertrain comprising:
a plurality of energy storage units having an energy storage capacity of at least 1,500 kWh;
a distribution bus coupled to the plurality of energy storage units;
at least one range extending generator coupled to the distribution bus to generate onboard generated power of at least 7.5 MW; and
a plurality of electric propulsors, coupled to the distribution bus to produce at least 10 MW of thrust power to fly the hybrid-electric aircraft with a cruise speed of at least 0.7 Mach,
wherein a degree of hybridization of the hybrid-electric aircraft, given by a ratio of energy expended from the plurality of energy storage units to a total amount of energy consumed by the plurality of electric propulsors, is at least 25% for the medium-haul flight having the range of at least 1,000 miles.

9. The hybrid-electric aircraft of claim 8, wherein a fan pressure ratio of the plurality of electric propulsors at the cruise speed of at least 0.7 Mach is between 1.15 and 1.19.

10. The hybrid-electric aircraft of claim 9, wherein each electric propulsor from the plurality of electric propulsors includes a variable pitch ducted fan.

11. The hybrid-electric aircraft of claim 8, wherein carbon dioxide equivalent ($CO_2e$) well-to-wake greenhouse gas (GHG) emissions of the series hybrid powertrain are less than 0.25 lbs/Available Seat Mile (ASM).

12. The hybrid-electric aircraft of claim 8, wherein the plurality of energy storage units have a specific energy of at least 250 Wh/kg.

13. The hybrid-electric aircraft of claim 12, wherein the specific energy of the plurality of energy storage units is at least 300 Wh/kg.

14. The hybrid-electric aircraft of claim 8, wherein the plurality of energy storage units have a specific energy of at least 250 Wh/kg and the hybrid-electric aircraft has a range of at least 1500 miles.

15. The hybrid-electric aircraft of claim 8, wherein each electric propulsor from the plurality of electric propulsors has a thrust power output of at least 4 MW when the hybrid-electric aircraft is moving at the cruise speed.

16. The hybrid-electric aircraft of claim 8, wherein the plurality of electric propulsors collectively have a thrust power output of at least 12 MW when the hybrid-electric aircraft is moving at the cruise speed.

17. The hybrid-electric aircraft of claim 8, further comprising a fuel storage tank, the hybrid-electric aircraft having an energy storage mass fraction of greater than 17% when the fuel storage tank is filled with fuel.

18. The hybrid-electric aircraft of claim 8, wherein the plurality of energy storage units are divided into at least three banks of energy storage units, each bank of energy storage units having an energy storage capacity of at least 1,500 kWh.

19. The hybrid-electric aircraft of claim 8, wherein the plurality of electric propulsions produce at least 15 MW of thrust power and have a fan pressure ratio between 1.15 and 1.19 at a cruise altitude of less than 32,000 feet while the hybrid-electric aircraft is moving at the cruise speed.

20. The hybrid-electric aircraft of claim 8, wherein the hybrid-electric aircraft is a vertical and/or short take-off and landing (VTOL and/or VSTOL or STOL) hybrid-electric aircraft.

* * * * *